(12) United States Patent
Burkhardt et al.

(10) Patent No.: US 12,436,067 B2
(45) Date of Patent: Oct. 7, 2025

(54) FLOW MEANS FOR REVERSING THE DIRECTION OF FLOW

(71) Applicant: WAGNER Group GmbH, Langenhagen (DE)

(72) Inventors: Lutz Burkhardt, Hannover (DE); Jonas Hartwig, Langenhagen (DE)

(73) Assignee: Wagner Group GmbH (DE)

( * ) Notice: Subject to any disclaimer, the term of this patent is extended or adjusted under 35 U.S.C. 154(b) by 382 days.

(21) Appl. No.: 18/082,009

(22) Filed: Dec. 15, 2022

(65) Prior Publication Data
US 2023/0194394 A1  Jun. 22, 2023

(30) Foreign Application Priority Data
Dec. 22, 2021  (DE) ...................... 10 2021 134 312.7

(51) Int. Cl.
*G01N 1/24* (2006.01)
*F04D 17/16* (2006.01)

(52) U.S. Cl.
CPC ............... *G01N 1/24* (2013.01); *F04D 17/16* (2013.01); *G01N 2001/245* (2013.01)

(58) Field of Classification Search
CPC ................ F04D 29/524; G01N 1/24
See application file for complete search history.

(56) References Cited

FOREIGN PATENT DOCUMENTS

CN          1740659        *  3/2006

* cited by examiner

*Primary Examiner* — John E Breene
*Assistant Examiner* — Alex T Devito
(74) *Attorney, Agent, or Firm* — Frank H. Foster; Kremblas & Foster (57) ABSTRACT

A flow means with a housing and a fan to generate a fluid flow within a pipe or hose line of an intake monitoring system. The fan can be connected to the pipe or hose line via connecting pieces and can be driven to rotate. The invention creates a flow means which enables the direction of flow to be reversed. Respective blocking means are assigned to the connecting pieces and can be moved from an intake position (PS), in which an intake region of the fan is connected to the respective connecting piece into an exhaust position (PB), in which an exhaust region of the fan is connected to the respective connecting piece so the flow within the pipe or hose line is in a first direction of flow (S1) or in a second direction of flow (S2) as a function of the position (PS, PB) of the blocking means.

18 Claims, 3 Drawing Sheets

FLOW MEANS FOR REVERSING THE DIRECTION OF FLOW

BACKGROUND OF THE INVENTION

The invention relates to a flow means with a housing and a fan arranged therein, which is used to generate a fluid flow within a pipe and/or hose line of an intake monitoring system, which fan can be connected to the pipe and/or hose line in a fluid-conducting manner via connecting pieces and can be driven to rotate about a fan axis in a direction of rotation.

The invention also relates to an intake monitoring system for detecting and/or locating a fire, an outbreak of fire, or a similar hazardous situation with such a flow means and to the use of such a flow means to reverse the direction of a fluid flow in a pipe and/or hose line of an intake monitoring system, wherein the pipe and/or hose line opens into one or more monitoring regions for the respective removal of a fluid sample via one or more intake openings.

In the field of fire detection and room monitoring, so-called intake monitoring systems have become established for the permanent monitoring of rooms for the outbreak of fire or other hazardous situations affecting the ambient air, such as a reduction in the oxygen content to below a breathable level; these intake monitoring systems continually take representative fluid samples (air samples) from the regions to be monitored and test them for fire or hazard parameters contained therein using a detection unit; these parameters include measurable, physical properties of the suctioned fluid samples, whose change or deviation from a tolerance range indicates the outbreak of a fire or another hazardous situation affecting the ambient air. Typical fire or hazard parameters are, e.g., solid, liquid, or gas fractions contained in the fluid sample, such as smoke particles, aerosols, steam, pyrolysis gases, thermolysis gases, gases which are hazardous to health, poisonous, or non-breathable, but also changes in temperature or the occurrence of ambient radiation. Such an intake monitoring system comprises a fluid line system with at least one pipe and/or hose line along which a plurality of intake openings is arranged. A flow means is used to generate a fluid flow within the pipe and/or hose line, which fluid flow suctions the fluid samples out of the regions to be monitored through the intake openings and transports them along the pipe and/or hose line in the direction of the detection unit. As a rule, a fan is used as the flow means, which fan is surrounded by a housing with an intake and an exhaust connection. Due to rotation of the fan around its axis of rotation, a pressure difference is generated inside the housing, so that the fluid or air is suctioned through the intake connection and blown out through the exhaust connection. By means of the intake or exhaust connections, the fan can be connected to the pipe and/or hose line in a fluid-conducting manner via respective line ends or other elements of the fluid line system or components of the intake monitoring system. Usually, the fan is either connected to the pipe and/or hose line with the intake connection indirectly via the detection unit so that the exhaust connection opens into the environment, or the fan is connected to the pipe and/or hose line with the intake connection and connected to the detection unit with the exhaust connection.

A corresponding intake monitoring system is disclosed, for example, in US patent specification U.S. Pat. No. 10,302,522 B2. In this document, an intake fan is connected to a network of lines comprising several sampling lines via its intake connection and to a particle detection chamber via its exhaust connection. In operation, the fan sucks in air samples via the sampling lines opening into respective sampling inlets and transports them to the particle detection chamber by means of a fluid flow directed from the sampling inlets toward the direction of the fan. The functionality of the intake monitoring system should be tested by reversing the direction of flow of the fluid flow and blowing air into the network of lines. The patent specification does not provide any specific information as to how such a reversal of the direction of fluid flow should take place.

A very similar intake monitoring system can be found in published application DE 103 48 565 A1, in which the measurement of a so-called runtime, i.e. the time that has elapsed between the start of intake by the fan and the first detection of a fire parameter by the detector, can be used to localize the source of the detected fire parameters. In order to measure the exact runtime, it is necessary to blow out the fluid samples contained in the respective pipeline before the start of intake by reversing the direction of flow, during which the fluid flow within the pipeline is directed from the fan toward the direction of the intake openings. The direction of flow is reversed here by reversing the direction of rotation of the fan. However, a reversal of the direction of rotation only results in a reversal of the direction of flow when using axial fans, in which the fluid is sucked in axially and also blown out axially. Irrespective of their direction of rotation, radial fans always suck in axially and blow out radially. The disadvantage of using axial fans is that they cannot generate the vacuum required for longer pipelines, and the use of an axial fan thus limits the line length of the intake monitoring system.

The use of two fans, which are operated alternately and with opposite direction of flows to reverse the direction of flow, is known, for example, from European published application EP 1 811 478 A1. However, the arrangement described entails significantly increased space requirements and leads to higher costs overall. Alternatively, the published application proposes connecting the fan to the pipeline system via a four-way valve. However, the use of a four-way valve leads to significantly higher costs. In addition, this variant entails increased space requirements, since there is no actual changeover between the intake connection and the exhaust connection, which is why the fan has to be connected to the pipeline system via additional line sections.

The use of shut-off valves to shut off a fluid flow is known from other technical fields, for example the exhaust flow control in a motor vehicle exhaust system. The shut-off arrangement described in European published application EP 1 503 062 A1 comprises a tubular housing in which a circular or disc-shaped shut-off valve is mounted so as to be rotatable about an axis extending transversely to the direction of flow. In a first position, an open position, the plane of the shut-off valve extends parallel to the direction of flow. This frees up the flow cross-section of the housing. The shut-off valve can be rotated 90° about the axis until the flow cross-section of the housing is closed in a second position.

It is the object of the present invention to create a flow means that is structurally simpler and more space-saving than the prior art, which enables a reversal in direction of the flow generated by a fan and, in particular, a sufficiently high-enough pressure difference for use in an intake monitoring system with any pipe and/or hose line length at the same time.

The object is achieved by a flow means, which can be connected to a pipe and/or hose line of an intake monitoring system in a fluid-conducting manner, an intake monitoring system with such a flow means, and the use of such a flow means for reversing the direction of a fluid flow in a pipe and/or hose line of an intake monitoring system.

A flow means according to the invention of the type described in more detail at the outset is characterized by blocking means respectively assigned to the connecting piece, which can be moved from a first position, an intake position, in which an intake region of the fan is connected to the respective connecting piece in a fluid-conducting manner, to a second position, an exhaust position, in which an exhaust region of the fan is connected to the respective connecting piece in a fluid-conducting manner. When the fan is in operation, the fluid flow within the pipe and/or hose line can be generated as a function of the respective position of the blocking means, either in a first direction of flow or in a second direction of flow.

According to the invention, a reversal of the direction of flow within a pipe and/or hose line can be brought about solely by the placement of blocking means without an activation of the fan, in particular a change in the direction of rotation of the fan, a change in the air flow guidance by the fan itself, or the use of additional valves or another fan being required. The fan is arranged inside the housing of the flow means. The housing comprises several, preferably two, connecting pieces, wherein, during operation of the fan, i.e. if the fan rotates in one direction of rotation about its axis of rotation, the intake connection is suctioned through one of the connecting pieces, and the exhaust connection is blown out through another respective connecting piece. By connecting one of the connecting pieces to a pipe and/or hose line, a fluid flow can be generated within the pipe and/or hose line. The blocking means, which are each assigned to a connecting piece and arranged in particular within the respective connecting piece, are used to reverse the fluid flow generated by the flow means or to "swap the intake and exhaust connections." For this purpose, the blocking means can be transitioned from a first position, an intake position, to a second position, an exhaust position. The housing of the flow means and the respective connecting pieces are constructed in such a way that, in the intake position of the blocking means, a fluid-conducting connection is realized between the respective connecting piece and the intake region of the fan, and, on the other side, a connection is blocked between the exhaust region and this connecting piece. In the exhaust position, which is a reversal, a fluid-conducting connection is established with the exhaust region of the fan, whereas the connection to the intake region is blocked.

Advantageous embodiments are claimed in the dependent claims and explained in more detail below.

SUMMARY OF THE INVENTION

According to an advantageous embodiment of the invention, at least one of the blocking means is in the intake position so that the fluid flow within the pipe and/or hose line can be generated in the first direction of flow, and one is in the exhaust position so that the fluid flow can be generated in the second direction of flow.

The at least one blocking means is preferably assigned to a connecting piece which is provided for connection to the pipe and/or hose line or is connected thereto. When the fan is in operation, a vacuum can be generated in the pipe and/or hose line and consequently a fluid flow can be generated in a first direction of flow, in the direction of the flow means. In the exhaust position of the at least one blocking means, the fan "blows" into the pipe and/or hose line, generating a fluid flow along the pipe and/or hose line in a second, opposite direction of flow, starting from the flow means.

In an exemplary embodiment variant of the invention, the design of the housing of the flow means is such that the connecting pieces have respective intake or exhaust openings that are structurally separate from one another, wherein a first intake or exhaust opening connects the intake region of the fan to a respective connecting piece, and a second intake or exhaust opening connects the exhaust region of the fan to a respective connecting piece, in a fluid-conducting manner.

In a refinement of this variant, when the blocking means is in the intake position, at least one of the intake or exhaust openings of a connecting piece is open and at least one other intake or exhaust opening of the same connecting piece is blocked by the blocking means.

In order to connect the respective connecting piece to the intake region of the fan in a fluid-conducting manner, a respective blocking means is in the intake position, so that preferably the first intake or exhaust opening, which connects the intake region of the fan to the connecting piece, is open, whereas the second intake or exhaust opening, which connects the exhaust region of the fan to the connecting piece, is blocked by the blocking means. To ensure that the connecting piece is connected to the exhaust region of the fan and thus that the flow generated in the pipe and/or hose line is reversed, the blocking means is in the exhaust position in which, specifically inversely, the first intake or exhaust opening is blocked and the second intake or exhaust opening is open.

Especially advantageously for this embodiment variant, the first and the second intake or exhaust opening of a respective connecting piece can be blocked by a common blocking means in such a way that, in the intake position of the blocking means, the first intake or exhaust opening is open and the second intake or exhaust opening is blocked and, in the exhaust position of the same blocking means, the second intake or exhaust opening is open and the first intake or exhaust opening is blocked.

According to a further variant of the invention, it is advantageous for the function if the blocking means assigned to the respective connecting pieces, in particular all blocking means, can be actuated via a common actuator and switched in opposite directions, so that the blocking means assigned to a connecting piece is in the intake position, provided the blocking means assigned to another connecting piece is in the exhaust position.

A stepper motor or servomotor can be used as an actuator, for example; alternatively, manually operated actuators such as adjusting levers or adjusting wheels can of course also be used. The blocking means can be switched in opposite directions by mechanically coupling the blocking means to one another, for example via a linkage or the connection via a common shaft.

The blocking means themselves can be designed as slides, valves, etc. in a manner known per se. According to an advantageous exemplary embodiment of the invention, at least one blocking means designed as a shut-off valve can be pivoted or folded from the intake position to the exhaust position, preferably by 180°, about a pivot axis extending parallel to the cross-sectional area of the respective connecting piece and/or the respective intake or exhaust openings of the connecting pieces.

According to another exemplary embodiment according to the invention, at least one blocking means designed as a rotation-blocking means can be rotated from the intake position to the exhaust position about an axis of rotation extending orthogonal to the cross-sectional area of the respective connecting pieces and/or of the respective intake or exhaust openings of the connecting pieces. In this embodiment, the cross-sectional area of the blocking means advantageously corresponds to the cross-sectional area of the respective connecting piece. An opening or recess extending through the cross-sectional area can then be provided, which can be brought into alignment with the first or the second intake or exhaust opening by rotating the blocking means about its axis of rotation such that this intake or exhaust opening is open, i.e. a fluid-conducting connection is enabled between the fan and the respective connecting piece. The other intake or exhaust opening is correspondingly blocked by the blocking means. In an especially expedient manner, a blocking means designed as a rotating means is assigned to each connecting piece. The blocking means can then be connected to one another via a common shaft in a position rotated by 180° with respect to the axis of rotation.

According to a further variant of the invention, it can be advantageous for the function that at least one of the blocking means can be moved into at least one additional, third position, in which a fluid-conducting connection is completely blocked between the fan and the respective connecting piece, so that neither the intake region nor the exhaust region of the fan is connected to this connecting piece in a fluid-conducting manner. In other words, in the third position, both the first and the second intake or exhaust opening of a connecting piece are blocked by the blocking means (rotation-blocking means). This third position is provided, for example, to check the functionality of the fan. Due to the suction into a closed system, there are defined framework conditions, so that the state of wear of the fan or a fan characteristic curve can be determined by determining various flow parameters and evaluating them.

According to a variant of the invention, the fluid flow within the pipe and/or hose line can be generated, as a function of the position of the blocking means, in a first direction of flow or in a second direction of flow during operation of the fan in the same direction of rotation.

In particular, both radial and axial fans can be used as fans. In the case of axial fans, the intake and exhaust regions of which are each formed axially, a reversal of the direction of rotation also results in a reversal of the flow being guided through the fan, i.e. the intake region and the exhaust region are "swapped." According to the variant of the invention described, instead of reversing the direction of rotation, a reversal of the direction of the fluid flow generated within the pipe and/or hose line is implemented solely by changing the position of the blocking means. This has the advantage that the fan can continue to be operated in the same direction of rotation even if the direction of the fluid flow reverses.

According to another variant of the invention, the fluid flow within the pipe and/or hose line can be especially expediently generated in a first direction of flow or in a second direction of flow during operation of the fan, regardless of its direction of rotation and as a function of the respective position of the blocking means.

For this purpose, the use of a radial fan with an axial intake region and a radial exhaust region, the fan axis of which is aligned orthogonal to the cross-sectional areas of the respective connecting pieces and/or of the respective intake or exhaust openings of the connecting pieces, has proven to be especially expedient. In contrast to the axial fan, a reversal of the direction of rotation of the radial fan does not result in a reversal of the flow being guided through the fan, i.e. the intake region and the exhaust region are not "swapped." A reversal of the direction of flow within the pipe and/or hose line is therefore completely independent of the direction of rotation of the fan and is implemented by the appropriate position of the blocking means. Compared to an axial fan, more vacuum can be created along a connected pipe and/or hose line with a radial fan. By allowing the direction of flow to be reversed, regardless of the direction of rotation of the fan and without the use of additional flow means, for example a second fan, being necessary, the possible uses of a flow means according to the invention, in particular in an intake monitoring system, can be expanded.

The object of the invention set at the outset is thus also achieved by an intake monitoring system for detecting and/or locating a fire, an outbreak of fire, or a similar hazardous situation with a flow means according to one of the previously described embodiments, as well as by the use of such a flow means to generate a fluid flow within a pipe and/or hose line of an intake monitoring system and to reverse this fluid flow from a first direction of flow to a second direction of flow, wherein the second direction of flow is preferably in the direction opposite to the first direction.

An intake monitoring system according to the invention has a fluid line system with at least one pipe and/or hose line, which opens into one or more monitoring regions via one or more intake openings for the respective removal of a fluid sample, and a detection unit for detecting fire or hazard parameters contained in the fluid sample. To generate a fluid flow within the pipe and/or hose line, the intake monitoring system has a flow means according to one of the previously mentioned embodiments. The flow means comprises a fan and preferably two connecting pieces, which are provided with respective blocking means. The flow means is connected to the pipe and/or hose line via at least one of the connecting pieces. During operation of the fan comprising flow means, the fluid flow within the pipe and/or hose line can be generated as a function of respective position of the blocking means in a first direction of flow or in a second direction of flow, which is in particular opposite the first direction of flow.

When using the flow means to generate a fluid flow, the fan is connected to the pipe and/or hose line via a connecting piece having at least one blocking means and is driven to rotate about a fan axis in one direction of rotation.

To reverse the direction of the fluid flow, either the at least one blocking means is moved from a first position, an intake position in which the intake region of the fan is connected to the pipe and/or hose line in a fluid-conducting manner, into a second position, an exhaust position, in which the exhaust region of the fan is connected to the pipe and/or hose line via the connecting piece in a fluid-conducting manner, or the at least one blocking means is moved from the exhaust position to the intake position.

Preferably, at least one connecting piece is connected to the pipe and/or hose line and has structurally separate intake or exhaust openings. A first intake or exhaust opening connects the intake region of the fan and a second intake or exhaust opening connects the exhaust region of the fan to the respective connecting piece in a fluid-conducting manner. To reverse the direction of the fluid flow, either the first intake or exhaust opening is blocked and the second intake or exhaust opening is opened by moving the blocking means from the intake position to the exhaust position, or the second intake or exhaust opening is blocked and the first intake or exhaust opening is opened by moving the blocking means from the exhaust position to the intake position.

Further details, features, feature (sub-) combinations, advantages, and effects based on the invention will be apparent from the following description of preferred exemplary embodiments of the invention and from the set of drawings. The following is shown:

BRIEF DESCRIPTION OF THE SEVERAL VIEWS OF THE DRAWINGS

The figures are only of an exemplary nature and serve to understand the invention. The same elements are provided with the same reference numerals and are usually only described once.

DETAILED DESCRIPTION OF THE INVENTION

Figure 1:
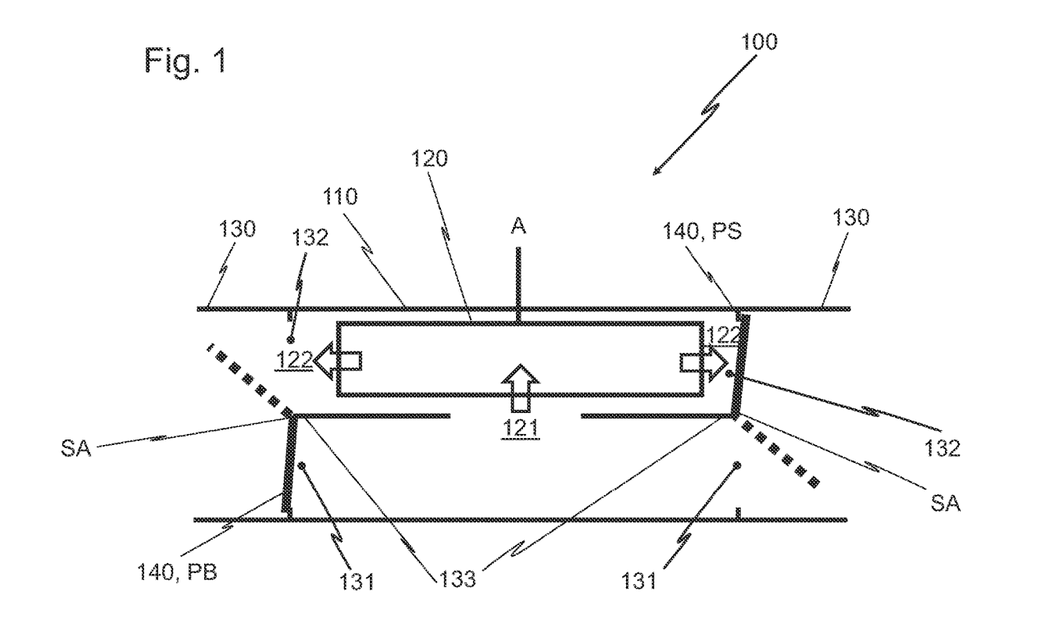
FIG. 1 shows a schematic side view of a first exemplary embodiment of the flow means according to the invention with two connecting pieces and two blocking means.

FIG. 1 shows a schematic side view of a first exemplary embodiment of the flow means 100 according to the invention. The flow means 100 comprises a fan 120 enclosed by a housing 110, a radial fan here by way of example, which can be driven to rotate about its fan axis A in order to generate a pressure difference. The pressure difference results in an intake region 121 and an exhaust region 122 in the region of the fan 120 as well as a flow directed from the intake region 121 in the direction of the exhaust region 122, which flow is illustrated in the drawing by means of arrows. In the radial fan used here, the intake region 121 is always formed axially and the exhaust region 122 is radially, regardless of the direction of rotation of the fan 120. The intake region 121 and the exhaust region 122 can be locally delimited by the geometry of housing 110. The housing 110 also has two connecting pieces 130 arranged opposite one another, which are suitable for connection to a pipe and/or hose line 210 (see FIG. 4). The blocking means 140 are assigned to respective connecting pieces 130. According to the embodiment shown here, exactly one blocking means 140 is assigned to each of the two connecting pieces 130. The blocking means 140 can each be moved from an intake position PS to an exhaust position PB, wherein one of the blocking means 140 is shown in the intake position PS and the other blocking means 140 is shown in the exhaust position PB. Due to the geometry of the housing 110, intake region 121 of the fan 120 is connected to the respective connecting piece 130 in a fluid-conducting manner in the intake position PS, and the same is true for exhaust region 122 in the exhaust position PB.

For example, as shown in FIG. 1, the connecting pieces 130 have respective intake or exhaust openings 131, 132, which are structurally separate from one another, wherein a first intake or exhaust opening 131 connects the intake region 121 and a second intake or exhaust opening 132 connects the exhaust region 122 of the fan 120 to the respective connecting piece 130 in a fluid-conducting manner. The intake or exhaust openings 131, 132 are structurally separated from one another, for example by an inner wall 133. When the fan 120 is in operation, a fluid flow can be generated in a pipe and/or hose line 210 by connecting at least one of the connecting pieces 130 thereto (see FIG. 4). The direction of flow of the fluid flow depends on the respective position PS, PB of the blocking means 140 and can be reversed by moving one blocking means 140 from the intake position PS to the exhaust position PB and the other blocking means 140 from the exhaust position PB to the intake position PS. In the illustration according to FIG. 1, the blocking means 140 are designed, for example, as shut-off valves and can be pivoted about a respective pivot axis SA between the intake position PB and the exhaust position PS, as indicated by the dashed lines.

Figure 2:
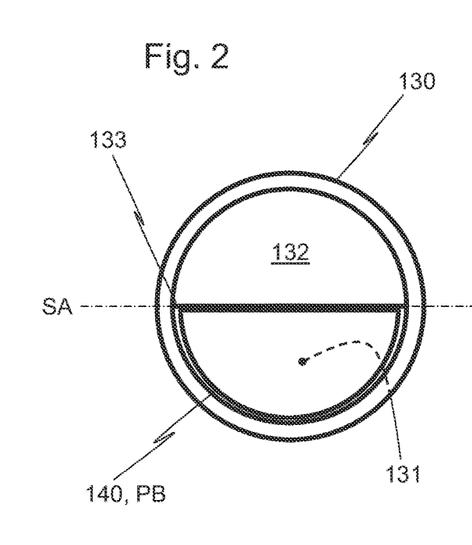
FIG. 2 shows a schematic front view of a connecting piece with an exemplary embodiment of a blocking means as a shut-off valve.

A blocking means 140 designed as a shut-off valve can also be seen in FIG. 2, which otherwise shows a schematic front view of a connecting piece 130. The connecting piece 130 is structurally subdivided into the intake or exhaust openings 131, 132 described above by means of an inner wall 133. The blocking means 140 is in the exhaust position PB, so that the first intake or exhaust opening 131 is blocked and the second intake or exhaust opening 132 is open. The blocking means 140 can be moved from the exhaust position PB into the intake position PS by pivoting about the pivot axis SA, which is arranged in a cross-sectional area of the connecting piece 130 and extends orthogonally to the flow. In this case the reverse is true; the first intake or exhaust opening 131 is then open and the second intake or exhaust opening 132 is closed (not shown). The pivot axis SA especially expediently extends along the inner wall 133, or the blocking means 140 designed as a shut-off valve is articulated to the inner wall 133. Preferably, two blocking means 140 assigned to a respective connecting piece 130 can be operatively connected to one another, for example by means of an attachment, and thus can be driven by a single actuator, for example an actuating motor.

Figure 3:
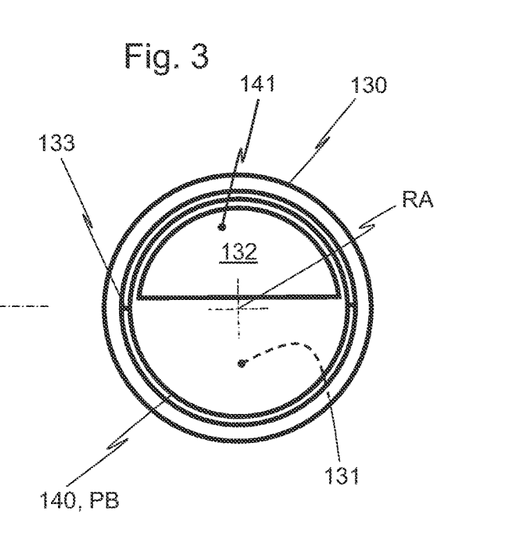
FIG. 3 shows a schematic front view of a connecting piece with an exemplary embodiment of a blocking means as a rotation-blocking means.

FIG. 3 shows the connecting piece 130 according to FIG. 2. The blocking means 140 shown here is also in the exhaust position PB but is designed as a rotation-blocking means. It has a cross-sectional area that roughly corresponds to the cross-sectional area of the connecting piece 130 as well as an opening or recess 141 extending through the cross-sectional area. In the exhaust position PB shown here, the opening or recess 141 is in alignment with the second intake or exhaust opening 132, so that the latter is open and the first intake or exhaust opening 131 is blocked. Due to rotation, in particular by 180°, about an axis of rotation RA extending orthogonally to the cross-sectional area of the connecting piece 130 and along the flow, the blocking means 140 can be moved from the exhaust position PB to the intake position PS, whereby the opening or recess 141 is brought in alignment with the first intake or exhaust opening 131, so that then, inversely, the first intake or exhaust opening 131 is opened and the second intake or exhaust opening 132 is blocked (not shown). Preferably, two blocking means 140 designed as rotation-blocking means and each assigned to a connecting piece 130 can be connected to one another via a common shaft and can thus be driven in opposite directions by a single actuator, for example an actuating motor.

Figure 4:
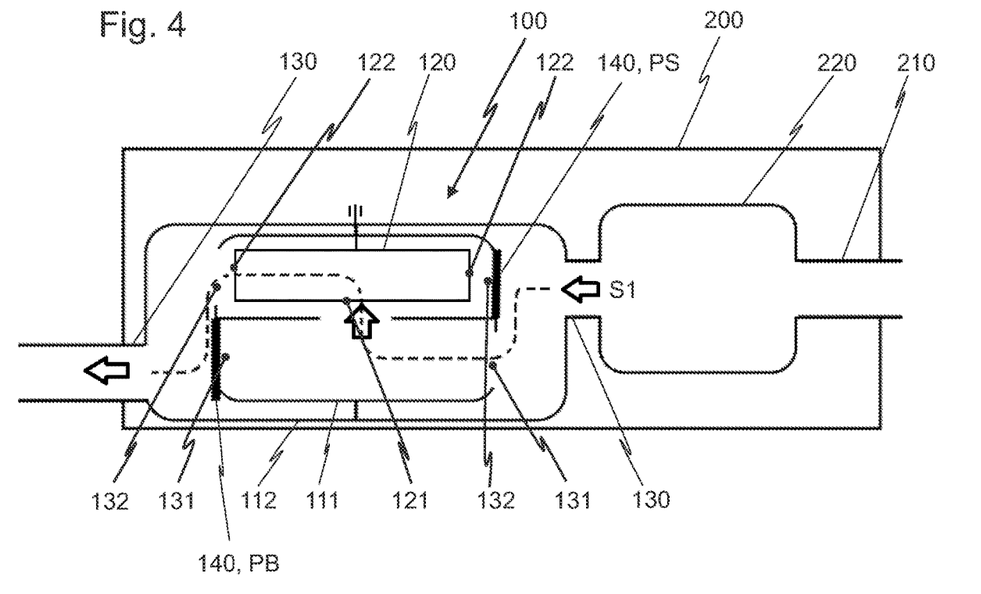
FIG. 4 shows a schematic side view of a second exemplary embodiment of the flow means according to the invention, which is connected to a pipe and/or hose line to generate a fluid flow in a first direction of flow via a connecting piece.

FIG. 4 shows a schematic side view of a second exemplary embodiment of the flow means 100 according to the invention. The flow means 100 shown here corresponds in its basic structure to that of the first exemplary embodiment, which is why not all components are described again in detail. Deviating from the first exemplary embodiment, the fan 120 here is surrounded by a double housing, which is divided into an outer housing 112 and a fan chamber 111 located therein. Due to the double housing, a modular structure of the flow means 100 can be implemented, which simplifies the retrofitting of existing systems. The two connecting pieces 130, which lie opposite one another, are formed on the outer housing 112, while the intake or exhaust openings 131, 132, which are respectively assigned to the connecting pieces 130, are on the fan chamber 111 and can be blocked by a respective blocking means 140.

The flow means 100 can be connected directly or indirectly to a pipe and/or hose line 210 of an intake monitoring system 200, which is only roughly indicated here, via one of the connecting pieces 130. The other connecting piece 130 also opens directly or indirectly into the environment or can be connected to a return line (not shown). A plurality of intake openings, not shown here, for the respective removal of a fluid sample from a monitoring region is arranged along the pipe and/or hose line 210. A fluid flow can be generated within the pipe and/or hose line 210 in a direction of flow via the connected flow means 100. In the first direction of flow S1 which is generated here and represented by arrows, fluid samples can be suctioned through the intake openings from the monitoring regions and transported along the pipe and/or hose line 210 in the direction of a detection unit 220. The detection unit 220 here is integrated into the pipe and/or hose line 210 upstream of the flow means 100 with respect to the first direction of flow S1, but could also be connected to the opposite connecting piece 130, i.e. downstream of the flow means 100.

The illustration according to FIG. 4 shows the blocking means 140, which is assigned to the connecting piece 130 connected to the pipe and/or hose line 210, in the intake position PS, wherein the first intake or exhaust opening 131 of this connecting piece 130 is open and the second intake or exhaust opening 132 is blocked. As a result, intake region 121 of the fan 120 is connected to the pipe and/or hose line 210 in a fluid-conducting manner via the connecting piece 130, indirectly via the detection unit 220. At the other, opposite connecting piece 130, the blocking means 140 there is in the exhaust position PB, with the first intake or exhaust opening 131 of this connecting piece 130 being blocked and the second intake or exhaust opening 132 being open. Correspondingly, the pipe and/or hose line 210 is "sucked in" and "blown out" at the opposite connecting piece 130, i.e. the fluid flow is generated in the first direction of flow S1, starting from the intake openings (not shown here) in the direction of the flow means 100. This state corresponds to the normal functioning of the intake monitoring system 200, wherein fluid samples are continually suctioned in and monitored for fire or hazard parameters contained therein by the detection unit 220.

Figure 5:
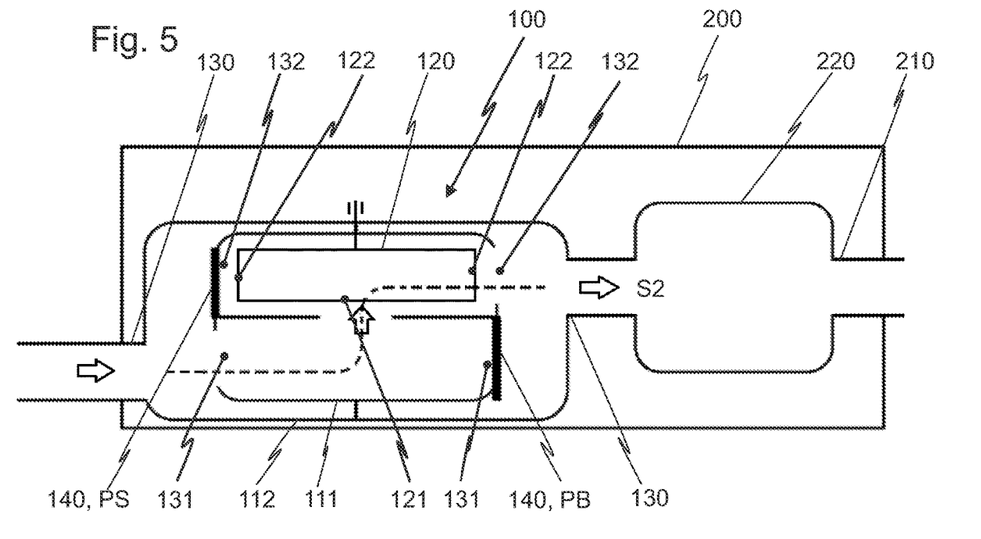
FIG. 5 shows a schematic side view of the second exemplary embodiment, wherein the fluid flow here is generated in a second direction of flow opposite to the first direction of flow.

FIG. 5 shows the flow means 100 according to FIG. 4, wherein the fluid flow is reversed here, i.e. in a second direction of flow S2, starting from the flow means 100 in the direction of the intake openings (not shown). For this purpose, the blocking means 140, which is assigned to the connecting piece 130 connected to the pipe and/or hose line 210, is in the exhaust position PB, so that the exhaust region 122 of the fan 120 is connected to the pipe and/or hose line 210 via the connecting piece 130, indirectly via the detection unit 220, in a fluid-conducting manner. The blocking means 140 is in the intake position PS at the other, opposite connecting piece 130. Correspondingly, the pipe and/or hose line 210 is "blown out" and "sucked in" at the opposite connecting piece 130. The function of reversing the direction of flow or "blowing out" is mostly used in intake monitoring systems 200 for locating the fire or hazard parameters detected by the detection unit 220 by determining the runtime. Other conceivable applications are functional testing of the intake monitoring system or a cleaning function, for example by blowing out blockages.

Figure 6:
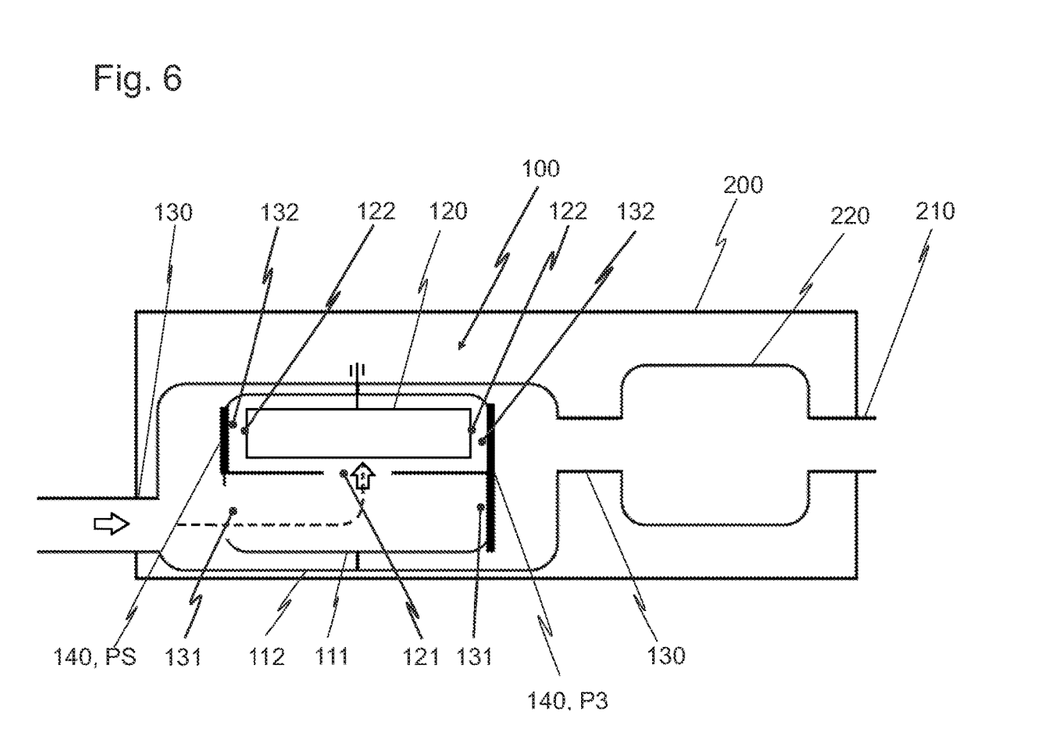
FIG. 6 shows a schematic side view of the second exemplary embodiment, wherein one of the blocking means is in a third position.

An additional third position, a blocking position P3, in which a fluid-conducting connection between the fan 120 and the intake connection 130 is completely blocked by the blocking means 140, is shown in FIG. 6, which otherwise shows the flow means 100 according to FIGS. 4 and 5. These show that the blocking means 140, which is assigned to the connecting piece 130 connected to the pipe and/or hose line 210, blocks both the first and the second intake or exhaust opening, 131 or 132. A third and, if necessary, further positions of the blocking means 140 can be implemented especially expediently using the design as rotation-blocking means, which can be rotated about its axis of rotation RA (see FIG. 3) to move to corresponding positions PS, PB, P3. The blocking means 140 is in the intake position PS at the opposite connecting piece 130, so that suctioning is carried out into the closed housing, in particular into the closed fan chamber 111, at this connecting piece 130. By blocking the fan chamber 111 completely on one side, fixed framework conditions can be created so that the state of wear of the fan 120 can be checked or the fan characteristics can be determined.

Due to the different positions PS, PB, P3 of the blocking means 140, respective flow conditions can be created in the fluid line system of an intake monitoring system 200, which enable respective operating modes. At the same time, the use of additional fans 120 or a reversal of the direction of rotation of a fan 120 can be dispensed with.

LIST OF REFERENCE NUMERALS

100 Flow means
110 Housing
111 Fan chamber
112 Outer housing
120 Fan
121 Intake region of fan
122 Exhaust region of fan
130 Connecting piece
131 First intake or exhaust opening
132 Second intake or exhaust opening
133 Inner wall
140 Blocking means
141 Opening or recess
200 Intake monitoring system
210 Pipe and/or hose line
220 Detection unit
A Fan axis
PS First position or intake position of the blocking means
PB Second position or exhaust position of the blocking means Third position or blocking position of the blocking means
RA Axis of rotation
S1 First direction of flow
S2 Second direction of flow
SA Pivot axis

The invention claimed is:

1. A fluid blower (100) for generating a fluid flow within a pipe or hose line (210) of an intake monitoring system (200) and capable of switching the direction of fluid flow between opposite directions, the fluid blower (100) comprising:
   (a) a housing (110) having a first connector (130,) configured to connect to a pipe or hose line (210) for carrying a fluid into or out of the housing (110) and having a second connector (132) configured to connect to a pipe or hose line (210) for carrying a fluid into or out of the housing (110);
   (b) an intake chamber (121) and an exhaust chamber (122) within the housing (110), the intake chamber (121) and the exhaust chamber (122) each having 9 an opening associated with and into the first connector (130) and an opening associated with and into the second connector (132);
   (c) a radial fan (120) rotatable around a fan axis (A) and mounted within the exhaust chamber (122) for generating a fluid flow within a pipe or hose line (210) of the intake monitoring system (200), the fan (120) being positioned with its fan axis (A) located adjacent an opening between the exhaust chamber (122) and the intake chamber (121);
   (d) a first blocking valve associated with the first connector (130), the first blocking valve being movable between a position (PS) blocking the opening between the first connector (130) and the exhaust chamber (122) and a position (PB) blocking the opening between the first connector (130) and the intake chamber (121); and
   (e) a second blocking valve associated with the second connector (132), the second blocking valve being movable between a position (PS) blocking the opening between the second connector (132) and the exhaust chamber 24 (122) and a position (PB) blocking the opening between the second connector (132) and the intake chamber (121).

2. The fluid blower (100) of claim 1 characterized in that the fluid flow within the pipe or hose line (210) is generated in a first direction of flow (S1) with at least one of the blocking valves (140) in the intake position (PS), and the fluid flow is generated in a second direction of flow (S2) with the same blocking valve (140) in the exhaust position (PB).

3. The fluid blower (100) of claim 1, characterized in that the connectors (130) have respective openings (131, 132), which are structurally separate from one another, wherein a first opening (131) connects to the intake chamber (121) and a second opening (132) connects to the exhaust chamber (122) in a fluid-conducting manner.

4. The fluid blower (100) of claim 3, characterized in that, when the blocking valve (140) is in the intake position (PS), at least one of the intake chamber or exhaust chamber openings (131, 132) associated with a connector (130) is open and at least one other intake chamber opening or exhaust chamber opening (131, 132) associated with the same connector (130) is blocked by the blocking valve (140).

5. The fluid blower (100) of claim 3, characterized in that a first and a second intake or exhaust opening (131, 132) associated with a connector (130) have a common blocking valve (140) configured in such a way that, in the intake position (PS) of this blocking valve (140), the first intake or exhaust opening (131) is open and the second intake or exhaust opening (132) is blocked and, in the exhaust position (PB), the second intake or exhaust opening (132) is open and the first intake or exhaust opening (131) is blocked.

6. The fluid blower (100) of claim 1, characterized in that the blocking valves (140) associated with a respective connector (130) are connected to a common actuator, the common actuator configured to be switchable in opposite directions, so that the blocking valve (140) assigned to one connector (130) is in the intake position (PS), when the blocking valve (140) associated with another connector (130) in the exhaust position (PB).

7. The fluid blower (100) of claim 6, characterized in that at least one blocking means (140) is a shut-off valve which is pivotable or foldable from the intake position (PS) to the exhaust position (PB) about a pivot axis (SA) extending parallel to a cross-sectional area of the respective connector (130) or of the respective intake or exhaust openings (131, 132) of the connector.

8. The fluid blower (100) of claim 6, characterized in that at least one blocking valve (140) is a rotating blocking valve which is rotatable from the intake position (PS) to the exhaust position (PB) about an axis of rotation (RA) extending orthogonal to a cross-sectional area of its associated connector (130) or of the respective openings (131, 132) associated with the associated connector.

9. The fluid blower (100) of claim 1, characterized in that at least one of the blocking valves (140) is movable into at least one additional, third position, a blocking position (P3), in which a fluid-conducting connection between the fan (120) and an associate connector (130) is completely blocked.

10. The fluid blower (100) of claim 1, characterized in that fluid flow within the pipe or hose line (210) is generated, as a function of the position (PS, PB) of the blocking valve (140), in a first direction of flow (S1) or in a second direction of flow (S2), during operation of the fan (120) in the same direction of rotation for both directions of fluid flow.

11. The fluid blower (100) of claim 10, characterized in that fluid flow within the pipe or hose line (210) is generated in a first direction of flow (S1) or in a second direction of flow (S2) during operation of the fan (120), regardless of the fan's direction of rotation and as a function of the respective position (PS, PB) of the blocking valves (140).

12. The fluid blower (100) of claim 11, characterized in that the fan (120) is a radial fan with an axial intake region (121) and a radial exhaust region (122), the fan axis (A) of which is orthogonal to the cross-sectional areas of the respective connectors (130) or of the chamber openings (131, 132) of associated connectors (130).

13. An intake monitoring system (200) for detecting or locating a fire, an outbreak of fire, or a hazardous situation, which intake monitoring system (200) has a fluid line system with at least one pipe or hose line (210), which opens into one or more monitoring regions via one or more intake openings for the respective removal of a fluid sample, and a detection unit (220) for detecting fire or hazard parameters contained in the fluid sample, characterized in that
   the intake monitoring system (200) generates a fluid flow within the pipe or hose line (210) and has a fluid blower (100) of claim 1, which fluid blower (100) is connected to the pipe or hose line (210) via its associated connector (130), so that, during operation of the fan (120), the fluid flow within the pipe or hose line (210) is generated in a first direction of flow (S1) or in a second direction of flow (S2) as a function of the respective position (PS, PB) of the blocking valves (140).

14. A method for using a fluid blower (100) of claim 1 for generating a fluid flow within a pipe or hose line (210) of an intake monitoring system (200) and for reversing this fluid flow from a first direction of flow (S1) to a second direction of flow (S2), characterized in that the fan (120) of the fluid blower (100) is connected to the pipe or hose line (210) via a connector (130) having at least one blocking valve (140) in order to generate the fluid flow and is driven to rotate about the fan axis (A) in one direction of rotation, wherein, to reverse the direction of the fluid flow, either at least one blocking valve (140) is moved from a first position, an intake position (PS), in which the intake chamber (121) of the fluid blower (120) is connected to the pipe or hose line (210) via its associated connector (130) in a fluid-conducting manner, into a second position, an exhaust position (PB), in which the exhaust chamber (122) of the fluid blower (120) is connected to the pipe or hose line (210) via the associated connector (130) in a fluid-conducting manner, or the at least one blocking valve (140) is moved from the exhaust position (PB) to the intake position (PS).

15. The method of use according to claim 14, characterized in that each connector (130) has associated intake or exhaust openings (131, 132), which are structurally separate from one another, wherein a first intake or exhaust opening (131) connects the intake chamber (121) of the fluid blower to its associated connector and a second intake or exhaust opening (132) connects the exhaust chamber (122) to its associated connector (130) in a fluid-conducting manner, and wherein, in order to reverse the direction of the fluid flow, either the first opening (131) is blocked and the second opening (132) is opened by moving the blocking valve (140) from the intake position (PS) to the exhaust position (PB), or the second opening (131) is blocked and the first intake or exhaust opening (132) is opened by moving the blocking valve (140) from the exhaust position (PB) into the intake position (PS).

16. An intake monitoring system (200) for detecting or locating a fire, an outbreak of fire, or a hazardous situation, which intake monitoring system (200) has a fluid line system with at least one pipe or hose line (210), which opens into one or more monitoring regions via one or more intake openings for the respective removal of a fluid sample, and a detection unit (220) for detecting fire or hazard parameters contained in the fluid sample, characterized in that the intake monitoring system (200) generates a fluid flow within the pipe or hose line (210) and includes blocking valves (140), a fluid blower (100) with a fan and is connected to the pipe or hose line (210) via a connector (130), so that, during operation of the fan (120) the fluid flow within the pipe or hose line (210) is generated in a first direction of flow (S1) or in a second direction of flow (S2) as a function of the respective position (PS, PB) of the blocking valves (140).

17. A method for using a fluid blower (100) for generating a fluid flow within a pipe or hose line (210) of an intake monitoring system (200) and for reversing this fluid flow from a first direction of flow (S1) to a second direction of flow (S2), characterized in that the fluid blower includes a fan (100) and is connected to the pipe or hose line (210) via a connector (130) having at least one blocking valve (140) in order to generate the fluid flow, the fan being driven to rotate about a fan axis (A) in one direction of rotation, wherein, to reverse the direction of the fluid flow, the blocking valve (140) is movable from a first position, an intake position (PS), in which an intake chamber (121) of the fluid blower is connected to the pipe or hose line (210) via the connector (130) in a fluid-conducting manner, into a second position, an exhaust position (PB), in which an exhaust chamber (122) in which the fan is positioned (120) is connected to the pipe or hose line (210) via the connector (130) in a fluid-conducting manner, or the blocking valve (140) is moved from the exhaust position (PB) to the intake position (PS).

18. The method of use according to claim 17, characterized in that the connector (130) has respective intake or exhaust openings (131, 132), which are structurally separate from one another, wherein a first intake or exhaust opening (131) connects the intake chamber (121) of the fluid blower (120) and a second intake or exhaust opening (132) connects the exhaust chamber (122) of the fluid blower (120) to a respective connector (130) in a fluid-conducting manner, and wherein, in order to reverse the direction of the fluid flow, either the first opening (131) is blocked and the second intake or exhaust opening (132) is opened by moving the blocking valve (140) from the intake position (PS) to the exhaust position (PB), or the second opening (131) is blocked and the first opening (132) is opened by moving the blocking valve (140) 14 from the exhaust position (PB) into the intake position (PS).

* * * * *